(12) United States Patent
Chang

(10) Patent No.: US 6,985,144 B2
(45) Date of Patent: Jan. 10, 2006

(54) LAYOUT DESIGN APPARATUS AND METHOD FOR THREE-DIMENSIONAL GRAPHICAL ENVIRONMENTS

(75) Inventor: Nelson Liang An Chang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 684 days.

(21) Appl. No.: 10/021,223

(22) Filed: Oct. 30, 2001

(65) Prior Publication Data

US 2003/0080960 A1 May 1, 2003

(51) Int. Cl.
*G06T 15/30* (2006.01)

(52) U.S. Cl. .................. 345/423; 345/419; 345/586

(58) Field of Classification Search ................ 345/419, 345/423, 586
See application file for complete search history.

(56) References Cited

U.S. PATENT DOCUMENTS 5,963,956 A * 10/1999 Smartt ........................ 707/104

OTHER PUBLICATIONS

ACM; CHI'95 Mosaic of Creativity; "Visual decision-making: Using treemaps for the analytical hierarchy process"; Asahi et al.; 1995, pags 405-406.*
David Turo et al.: Improving the Visualization of Hierarchies with Treemaps; Design Issue and Experimentation; IEEE Comp. Soc. Press, US, vol. Conf3, Oct. 19, 1992 pp. 124-131.
Brian Johnson et al: "Tree-maps: A space-filling approach to the visualization of hierarchical information structure"; IEEE Comput. SOC, US, Oct. 22, 1991 pp.: 284-291.
Mark Bruls et al: "Squarifed Treemaps" IEEE TCVG Symposium on Visualization 2000 pp. 33-42/.

* cited by examiner

*Primary Examiner*—Kimbinh T. Nguyen

(57) ABSTRACT

An apparatus and method for partitioning a three-dimensional graphical environment for displaying representative images of objects in a database dependent on the database of objects and their associated metadata is described. According to the apparatus and method, the database of objects is represented by a hierarchical tree derived from the object metadata. The tree includes parent nodes, their associated child nodes, and data object nodes, where every node has an associated weight. A predetermined parent node is pre-assigned an area corresponding to the undivided graphical environment. Then, for each parent node having at least two associated child nodes in the tree, the area is recursively divided into a plurality of areas corresponding to each of the associated child nodes such that the areas are proportional to the child node weights.

9 Claims, 5 Drawing Sheets

LAYOUT DESIGN APPARATUS AND METHOD FOR THREE-DIMENSIONAL GRAPHICAL ENVIRONMENTS

FIELD OF THE INVENTION

The present invention relates to a technique for designing the layout of a three-dimensional graphical environment and in particular, this disclosure provides an apparatus and method for partitioning a three-dimensional graphical environment dependent on a data object database and the data objects' associated metadata.

BACKGROUND OF THE INVENTION

Databases are often used to store information relating to large numbers of objects such as products, works of art, museum pieces, or books. Due to their size, it can be difficult to search or browse through the information stored in these databases. In many applications, it is particularly desirable to make browsing through these databases an intuitive or simple process, particularly for unsophisticated computer users or browsers. For instance, online shopping has gained popularity mainly due to its convenience. In particular, shopping can be quickly accomplished in the comfort of one's own home or office at any time, day or night. As a result, many retail stores have websites on the Internet that allow a user to select a product and purchase it online. However, if it is difficult for a typical consumer having limited computer savvy to find products on the website, the convenience of on-line shopping becomes severely diminished.

Three-dimensional graphical environments have been used to allow viewing of and navigation through information and databases (such as on a retail website) in an intuitive manner. Specifically, a three-dimensional graphical environment allows a user to intuitively navigate within a virtual space and hence easily locate and view items within the space. In order to create a three-dimensional graphical environment, it is typical to divide or partition the environment into a plurality of three-dimensional areas (e.g. rooms) that has the effect of logically dividing and displaying the objects within the environment. Essentially, partitioning the environment and distributing objects within the partitioned environment facilitates navigation through the environment.

Currently, algorithms for partitioning a three-dimensional graphical environment are designed to accommodate a statically partitioned environment in which the number of items that are placed within each partitioned area does not change. As a result, the partitions need only be determined once and consequently the complexity of the algorithm is of little or no concern. However, in the case of a dynamically partitioned environment, in which the environment may be continually repartitioned and objects may be changed in numbers and/or regrouped and repositioned, the partition algorithm needs to have a minimal impact on the total process of rendering the three-dimensional graphical environment.

The present invention is an apparatus and method of generating a three-dimensional graphical environment for viewing a plurality of objects in a database and more particularly, is an apparatus and method of partitioning the three-dimensional graphical environment in an aesthetically pleasing, logical, and simplified manner to further enhance browsability and navigation of the environment.

SUMMARY OF THE INVENTION

An apparatus and method for partitioning a three-dimensional graphical environment for displaying images representing a database of objects is described.

According to one embodiment of the method, a database of objects is represented by a hierarchical tree derived from the data object metadata. A predetermined parent node is pre-assigned an area corresponding to an undivided three-dimensional graphical environment. Then, starting with the predetermined node, for each parent node having at least two associated child nodes in the tree, the area is recursively partitioned into a plurality of areas corresponding to each of the associated child nodes such that the areas are proportional to the child node weights.

The apparatus according to one embodiment of the present invention includes a tree deriver, a weight determiner, and an area partitioner. The tree deriver derives a hierarchical tree representative of a database of objects from the object metadata. The weight determiner determines an associated weight for each node of the tree and provides it to the area partitioner such that the area associated with the graphical environment is partitioned into a plurality of areas proportional to the node weights of the hierarchical tree.

DETAILED DESCRIPTION

Figure 1:
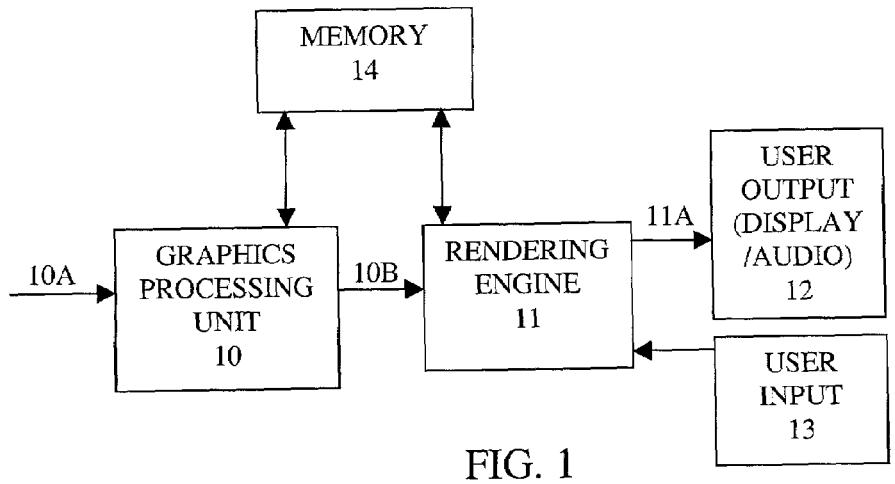
FIG. 1 illustrates a prior art system for rendering and displaying a three-dimensional graphical environment.

An apparatus and method for partitioning a three-dimensional graphical environment for displaying representative images of data objects is described in which the environment is partitioned according to the data objects and their corresponding metadata. In general, the present invention is directed towards an apparatus and method in which partitioning is performed dependent on a hierarchical tree derived from metadata associated with the data objects. The tree is used to define a grouping of the data objects in the database according to at least one selected metadata type. The tree includes a plurality of nodes that are weighted dependent, at least in part, on data object node weight. The node weighting is then used to divide the environment into areas, each area proportional to a corresponding node weighting.

It should be noted that according to this description, a data object is broadly defined as data stored within a database that corresponds to a tangible or intangible object or element. Examples of types of data objects can include but are not limited by image data, audio data, word processing data, video data, and three-dimensional data. Examples of types of objects or elements can include but are not limited to movie videos, CDs, works of art, electronic word processing documents, electronic personnel records and commercial inventory. If, for instance, the object type is movie videos, a specific object of that type would be a particular movie.

Each data object has associated data referred to as metadata which corresponds to any data other than the data object itself that describes or relates to the data object, and each data object may have different types of metadata. For instance, in the case in which the object type is movie videos, types of metadata may include data corresponding to the title, director, release date, actors, and genre (e.g., comedy, drama) etc. In contrast, in the case in which the object type is artwork, types of metadata may include title of the work and school of art (e.g., modem, impressionistic). Metadata can be stored with the data object or may be stored separately such that a link exists between the data object and its associated metadata.

In general, a plurality of data objects stored within a database are related such that they can be logically viewed, categorized, grouped, ordered and/or arranged in some way with respect to their associated data object metadata. For instance, movies stored within a database can be grouped according to director so as to allow a viewer to review the data by a particular director.

According to the present invention, representative images of data objects stored within a database are displayed within a three-dimensional graphical environment to provide a user who wants to browse the database the ability to intuitively view the data objects. In accordance with the present invention, representative images can be embodied as text labels, natural images, graphical images, document and file folder images, video images, three-dimensional models, or any type of visual data related to or representative of the object. Moreover, representative images can be interactive when directly or indirectly selected by the user. For instance, a representative image embodied as a three-dimensional model may be rotated by a user to provide the user with additional views of the model. Alternatively, a representative image embodied as a video image may begin to play when a user approaches it within the three dimensional environment. In addition, representative images may be directly or indirectly selected to access additional related multi-media data. For instance, a two-dimensional representative image may be selected so as to access an audio clip associated with the data object, access a three-dimensional model of the corresponding two-dimensional image, access a video sequence, etc.

An example of a system for rendering and displaying a three-dimensional image is shown in FIG. 1 that includes a graphics processing unit 10, a rendering engine 11, a user output 12, a user input 13, and memory 14. The graphics processing unit 10 functions to receive data object data 10A and generate three-dimensional imaging data 10B corresponding to a three-dimensional environment including representative images of the data objects within the three-dimensional environment as is well known in the field of graphics imaging. Rendering Engine 11 receives imaging data 10B and generates rendering data 11A for driving user output 12. For instance, rendering data 11A drives a monitor (not shown) to display the three-dimensional environment including the representative images. User input 13 provides an interface between a user and the three-dimensional environment so as to allow the user to interact with the three-dimensional environment. For instance, the user input 13 allows a user to change a point of view within the three-dimensional environment by moving a displayed cursor using a keyboard or mouse. Other types of user input 13 include but are not limited to a joystick and a pressure sensitive screen. Graphics processing unit 10 may function to generate the representative images of the data objects or the representative image data may be stored within the memory 14 and linked to the data object database.

Figure 2A:
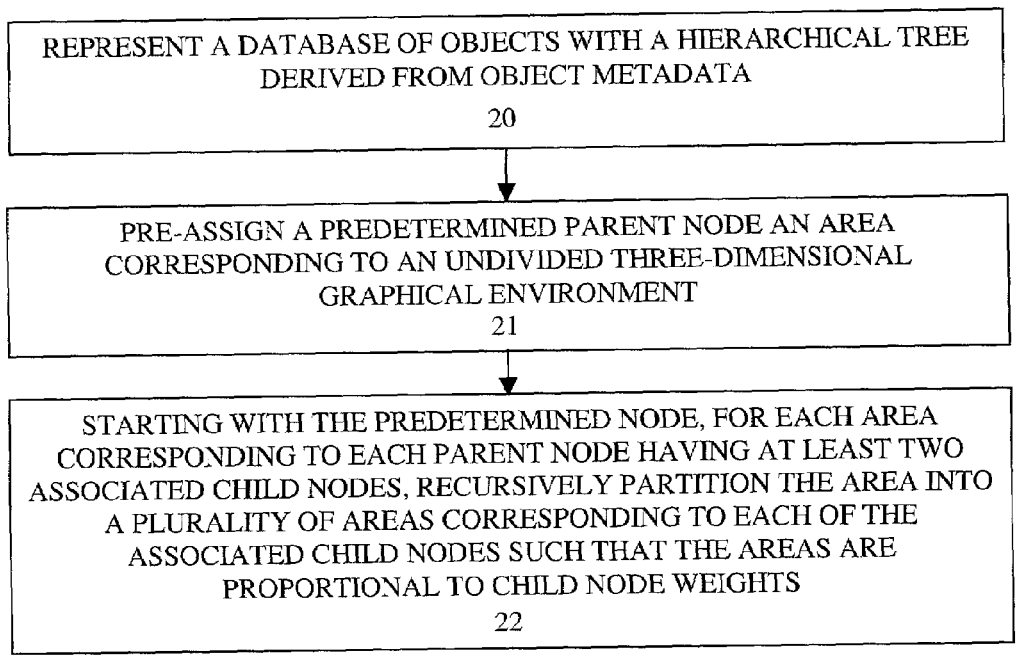
FIG. 2A illustrates a first embodiment of a method for partitioning a three-dimensional graphical environment according to the present invention.

According to a first embodiment of the method of the present invention as shown in FIG. 2A, a database of objects is presented by a hierarchical tree derived from object metadata (block 20), a predetermined node is pre-assigned an area corresponding to an undivided three-dimensional graphical environment (block 21). Then, starting at the predetermined node, for each area corresponding to each parent node having at least two associated child nodes in the tree, the area is recursively partitioned into a plurality of areas corresponding to each of the associated child nodes such that the areas are proportional to the child nodes' weights (block 22).

Figure 2B:
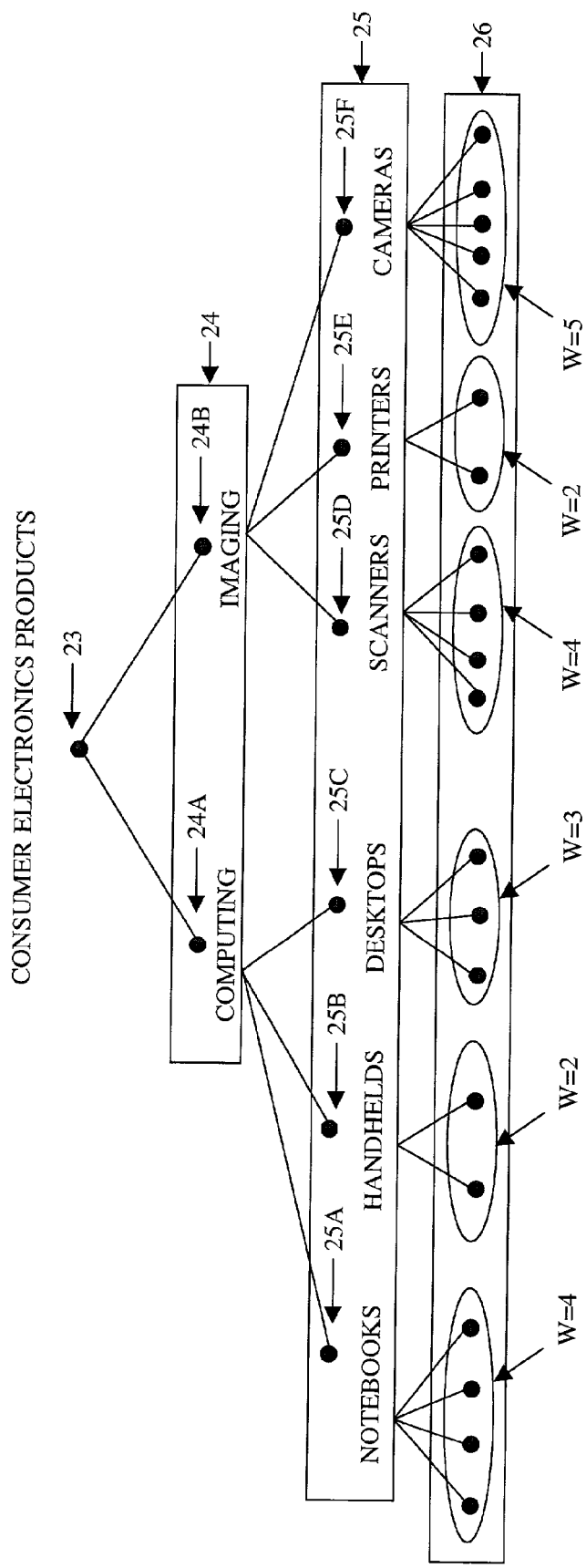
FIG. 2B illustrates an example of a hierarchical tree representing a database of data objects dependent on associated metadata.

FIG. 2B shows an example of a database represented by a hierarchical tree. The tree includes a plurality of nodes 23, 24A, 24B, 25A–25C, 25D–25F, and 26. The tree nodes can be classified as a parent node or child node dependent on their relationship to other nodes in the tree. For instance, node 23 is the parent node to child nodes 24A and 24B, node 24A is the parent node to child nodes 25A–25C, node 24B is the parent node to child nodes 25D–25F. Nodes 26 are data object nodes each corresponding to one of the data objects within the database. Hence, each of the nodes 25A–25F is the parent node of a corresponding group of data object child nodes.

In addition, each of the nodes 23–25 corresponds to different metadata types used for classifying the data object nodes 26. For instance, nodes 24 correspond to product function type that includes computing type products and imaging type products. Under the computing type product node are a first set of device type nodes including notebooks, handhelds, and desktops. Under the imaging type product node are a second set of device type nodes including scanners, printers, and cameras. Under each of the device type nodes are the actual products each corresponding to a data object within the database.

Each node in the tree has a weight determined by the weighting of data objects associated with it. The weight of a given node is determined by traversing downward along all continuous paths within the tree to the data object nodes to determine the combined weighting of the data objects associated with the given node along the continuous path. For instance, in this example, assuming each data object node has a weighting of one, node 25A has a weight W=4, node 25B has a weight W=2, node 25C has a weight W=3, node 25D has a weight W=4, node 25E has a weight W=2, node 25F has a weight W=5. Hence, by traversing from each of nodes 24A and 24B to data object nodes 26 along all continuous paths within the tree, node 24A has a weight W=9 and node 24B has a weight W=11. It should be noted that according to the apparatus and method of the present invention, nodes can be weighted in a variety of manners according to the users preference, system default settings, or other node weighting methodologies. For instance, the object nodes may have a weight greater than one or some non-object nodes (e.g., 23–25) may have an additional associated weighting factor that is not dependent on the weight of the data objects associated with them. As a result, node weight determination may be dependent on the manner in which the nodes of the tree are initially weighted in addition to the data object weight associated with it. In other cases, the weight of the nodes may be indirectly related to the data object weight associated with it.

Figure 2C:
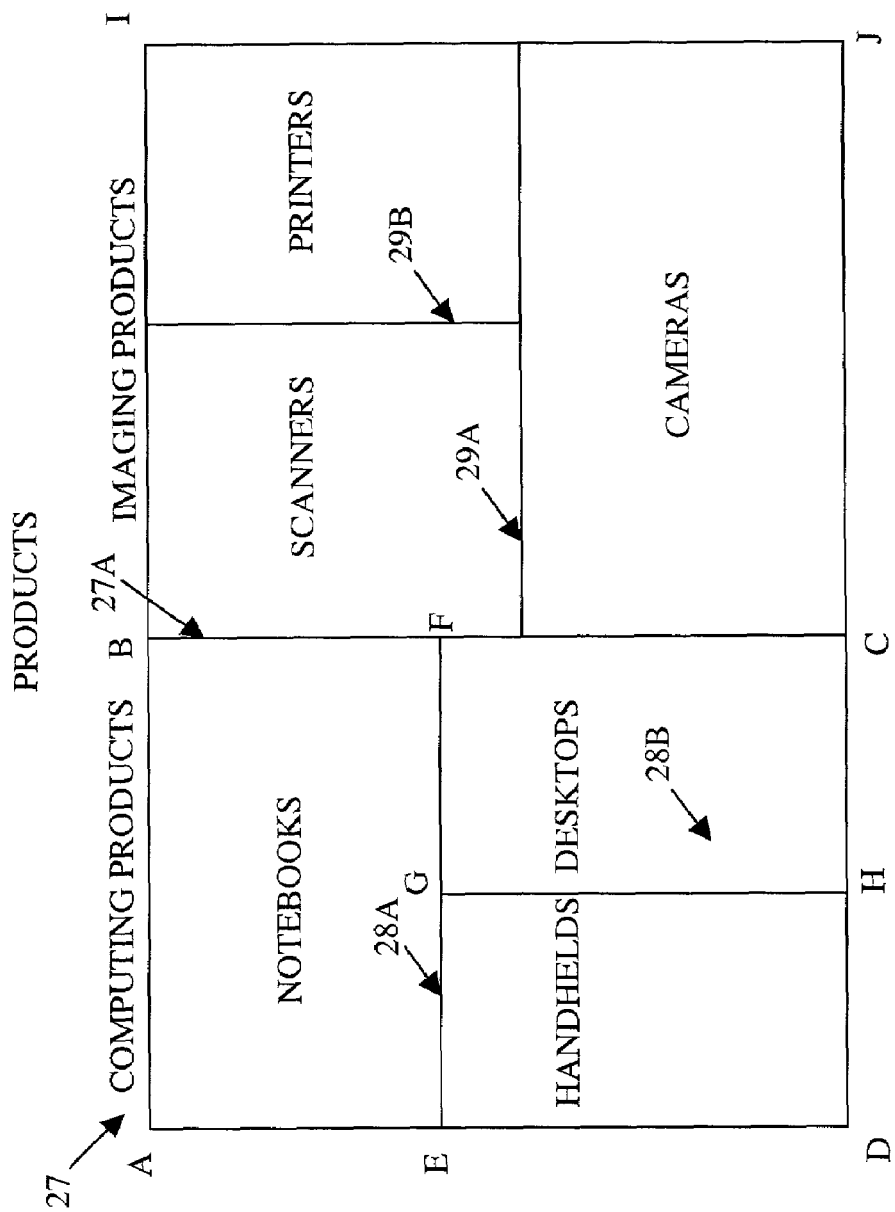
FIG. 2C illustrates an example of a three-dimensional graphical environment partitioned according to the method of present invention shown in FIG. 2A.

FIG. 2C shows an example of a two-dimensional area corresponding to the layout of a three-dimensional graphical environment partitioned according the method of the present invention using the hierarchical tree shown in FIG. 2B. In this example, the database of objects is represented by a hierarchical tree derived from object metadata by grouping objects according to three metadata types: electronic products, their function, and device type. Next, the topmost node of the tree, node 23, is pre-assigned to an undivided three-dimensional graphical environment. In this example, the three-dimensional environment corresponds to the two-dimensional area 27 bounded by vertices A,I,J,D (FIG. 2C). Node 23 is a parent node having at least two child nodes including nodes 24A and 24B. Each of child nodes 24A and 24B have a weight of W=9 and W=11, respectively. Then, starting with node 23, area 27 is divided by partition 27A to form two areas each proportional to the weights of nodes 24A and 24B: one corresponding to computing products and the other corresponding to imaging products. More particularly, the area corresponding to computing products is 9/20 of the total area 27 and the area corresponding to imaging products is 11/20 of the total area 27. Similarly, the computing products area (FIG. 2C) associated with the next parent node in the tree, node 24A, is proportionally divided by partitions 28A and 28B dependent on the weights of nodes 25A–25C and the imaging products area (FIG. 2C) associated with the last parent node, 24B, is proportionally divided by partitions 29A and 29B dependent on the weights of nodes 25D–25F.

Figure 3:
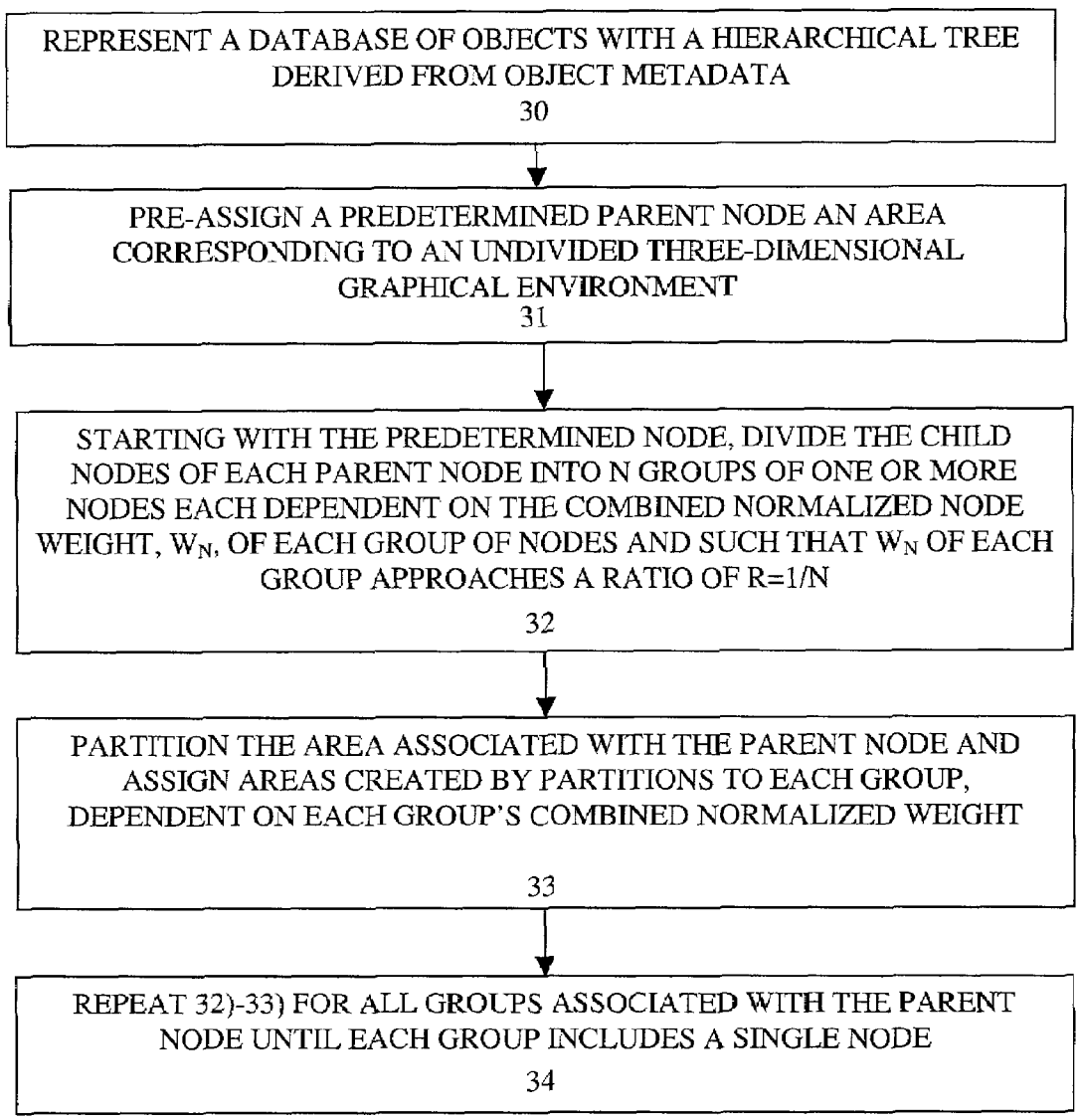
FIG. 3 illustrates a second embodiment of a method for partitioning a three-dimensional graphical environment according to the present invention.

FIG. 3 shows a second embodiment of the method of partitioning a three-dimensional graphical environment. First, the database of objects is represented by a hierarchical tree derived from object metadata (block 30) and a predetermined node is pre-assigned an area corresponding to an undivided three-dimensional graphical environment (block 31). Next, starting with the predetermined node, the child nodes of each parent node including at least two nodes each are divided into N groups of one or more nodes each (block 32). For instance, in the case in which N=2 and referring to the example shown in FIG. 2B, the child nodes 25A–25C of parent node 24A are divided into two groups. The nodes are divided such that the combined normalized weight, $W_N$, of each group approaches a ratio of R=1/N (block 32), or in this case R= 0.5. Moreover, the normalized weights of nodes 25A, 25B, 25C are $W_N$=1/9, $W_N$=2/9 and $W_N$=3/9 respectively. The following are three possible groupings of these three nodes into two groups of nodes and the combined normalized weight (WEIGHT1 and WEIGHT2) of each of the two groups (GROUP1 and GROUP2) for each grouping:

TABLE 1

| GROUP-ING# | GROUP 1 | GROUP 2 | WEIGHT 1 | WEIGHT 2 |
|---|---|---|---|---|
| 1 | 25A and 25B | 25C | 6/9 | 3/9 |
| 2 | 25A | 25B AND 25C | 4/9 | 5/9 |
| 3 | 25A AND 25C | 25B | 7/9 | 2/9 |

Table 1 shows GROUPING#2 having GROUP1 and GROUP2 each having combined normalized weights that approach the ratio of 0.5 where GROUP1 includes node 25A and GROUP2 includes nodes 25B and 25C. It should be noted that not all possible groupings need to be evaluated as shown in Table 1. This is especially true for trees having a large number of nodes. For instance, in one embodiment only groupings that keep the same left-to-right ordering as shown in the tree are considered. Referring to the above example, only GROUPING#1 and GROUPING#2 would be considered as possible groupings because GROUPING#3 does not preserve the left-to-right ordering.

Next, the area corresponding to the parent node associated with the groups of child nodes is partitioned dependent on each group's ratio (block 33). In this case, the area associated with the parent node is the computing products area which is then proportionally divided by partition 28A into two areas dependent on each of their combined ratios (i.e., 4/9 and 5/9), the smaller area corresponding to node 25A (i.e., GROUP1) and the larger area corresponding to nodes 25B and 25C (i.e., GROUP2). As shown in FIG. 2C, partition 28A divides the area corresponding to the computing product bounded by corners A,B,C,D into two areas A,B,F,E and E,F,C,D. Area A,B,F,E is assigned to the notebook products group (node 25A, GROUP1) and area E,F,C,D is assigned to the handheld and desktop products (nodes 25B and 25C, GROUP2).

According to the method shown in FIG. 3, blocks 32–33 are repeated for all groups associated with the parent node until each group includes a single node. Following the example, GROUP2 includes two nodes, 25B and 25C, so according to block 34, blocks 32–33 are repeated on this group such that GROUP2 is divided into two groups (block 32). Since there are only two nodes in the group and there is only one way to divide the group, the weight of the nodes does not determine how the group is divided. Next, the area is partitioned dependent on each group's normalized weight (block 32). The normalized weight of node 25B is now 2/5 and the normalized weight of node 25C is 3/5 so the area E,F,C,D is proportionally divided by partition 28B into two areas such that node 25B is assigned to 2/5 of the area and node 25C is assigned to 3/5 of the area. As shown in FIG. 2C, the area E,G,H,D is assigned to the handheld products (node 25B) and the area G,F,C,H is assigned to the desktop products (node 25C). The imaging product area B,I,J,C is proportionally divided in the same manner as the computing product area by partitions 29A and 29B.

Figure 4:
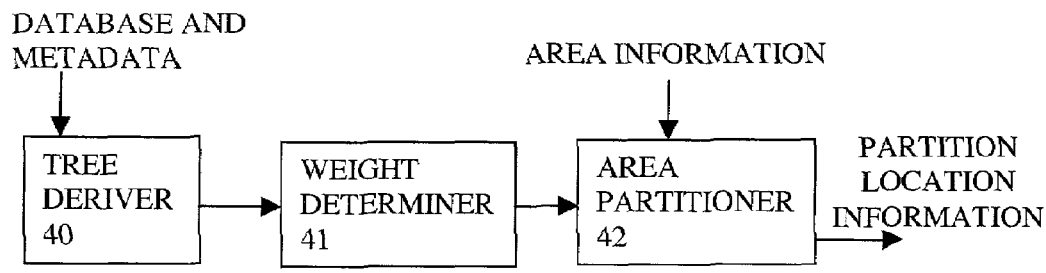
FIG. 4 illustrates a first embodiment of an apparatus for partitioning a three-dimensional graphical environment.

FIG. 4 shows a first embodiment of an apparatus for partitioning a three-dimensional graphical environment dependent on a database of objects and corresponding object metadata that includes a tree deriver 40, a weight determiner 41 and an area partitioner 42. The tree deriver 40, coupled to the database and the object metadata, derives a hierarchical tree representative of the database of objects based on the object metadata. The weight determiner 41 obtains hierarchical tree information from tree deriver 40 that includes at least the parent, child, and object node information as well as any initial weighting of the nodes. The weight determiner 41 determines the weight of each parent node and provides these weights to the area partitioner 42. Using the node weights provided from the weight determiner 41, the area partitioner 42 proportionally divides each area associated with each parent node having at least two associated child nodes into a plurality of areas corresponding to each of the associated child node weights to determine the partition location information.

Figure 5:
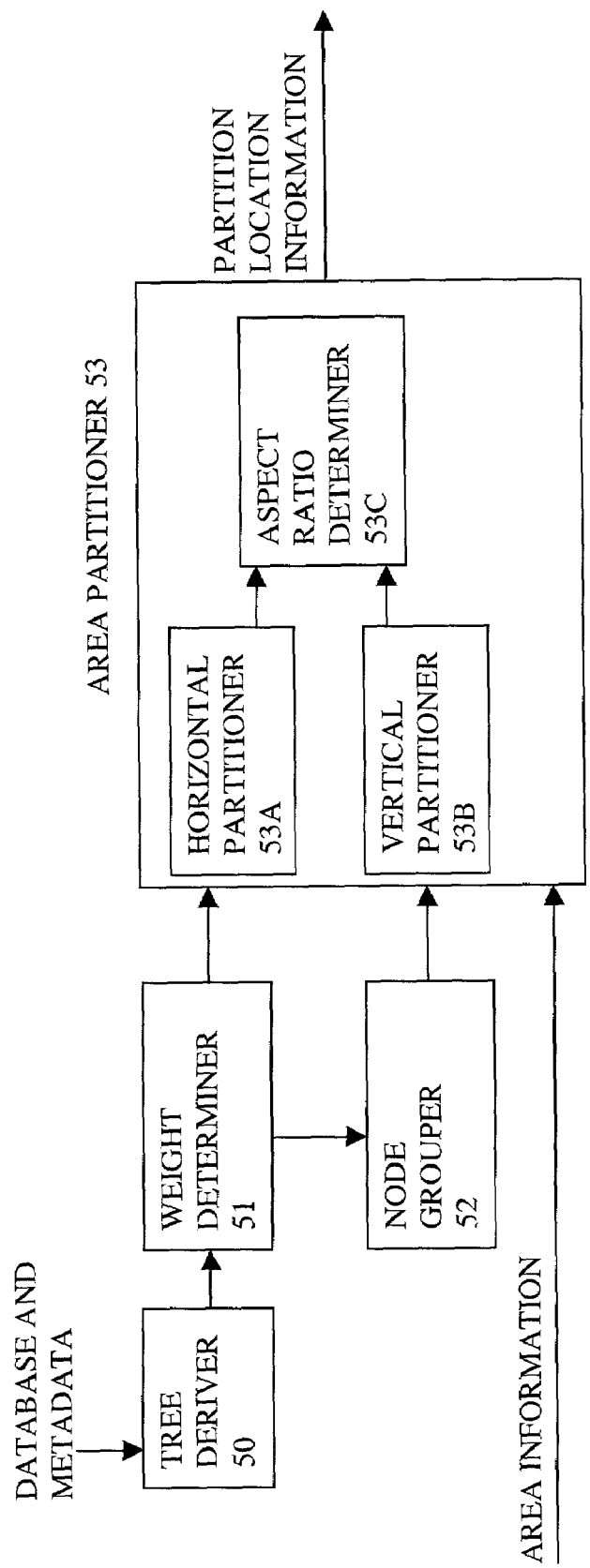
FIG. 5 illustrates a second embodiment of an apparatus for partitioning a three-dimensional graphical environment.

FIG. 5 shows a second embodiment of the apparatus for partitioning a three-dimensional graphical environment that includes a tree deriver 50, a weight determiner 51, a node grouper 52, and an area partitioner 53. The tree deriver 50 provides derived hierarchical tree information to the weight determiner 51, which in turn determines the weight of each node and provides it to the node grouper 52. The node grouper identifies parent nodes and divides the child nodes of each parent node into N groups of one or more nodes each dependent on the combined normalized node weight of each group of nodes such that the combined weight of each group approaches a ratio of R=1/N. The area partitioner 53 determines how the area associated with the parent node is to be partitioned dependent on the combined normalized weights of each group of child nodes.

According to this embodiment, the area associated with the parent node can be divided with a horizontal partition or a vertical partition. Referring to FIG. 2C, 28A and 29A are horizontal partitions and 27A, 28B and 29B area vertical partitions. The area partitioner includes a horizontal partitioner 53A, a vertical partitioner 53B, and an aspect ratio determiner 53C. One of a horizontal or vertical partition is used to divide areas dependent on the aspect ratio of the area created by the partitions. Since, in general, square rooms are more aesthetically pleasing than long skinny rooms in a three-dimensional graphical environment, it is preferred to divide the environment into more squarish areas, or in other words, areas having smaller aspect ratios. Hence, aspect ratio determiner 53C determines the aspect ratio for the areas that would be created by each of a vertical and horizontal partition and then the partition that yields the smallest aspect ratio for each area is selected to partition the area. It should be understood that an alternative embodiment is possible in which the partition type (i.e., vertical or horizontal) is selected which creates areas having some function of a selected aspect ratio. In still another embodiment, a partition type that is neither vertical nor horizontal (not shown) may be selected dependent on other selection criteria. For example, partitions may be at angles other than orthogonal or they might not even be straight partitions.

It should be understood that the apparatus shown in FIGS. 4 and 5 can be implemented in any combination of hardware, software, or firmware.

In the preceding description, numerous specific details are set forth in order to provide a thorough understanding of the present invention. It will be apparent, however, to one skilled in the art that these specific details need not be employed to practice the present invention. In other instances, well-known techniques have not been described in detail in order to avoid unnecessarily obscuring the present invention.

In addition, although elements of the present invention have been described in conjunction with certain embodiments, it is appreciated that the invention can be implemented in a variety of other ways. Consequently, it is to be understood that the particular embodiments shown and described by way of illustration is in no way intended to be considered limiting. Reference to the details of these embodiments is not intended to limit the scope of the claims which themselves recited only those features regarded as essential to the invention.

I claim:

1. A method for partitioning a three-dimensional graphical environment for displaying representative images of objects in a database comprising:

representing the database of objects with a hierarchical tree derived from object metadata;

pre-assigning a predetermined parent node to an area corresponding to the undivided graphical environment;

starting with the predetermined node, for each area corresponding to each parent node in the tree having at least two associated child nodes:

dividing the associated children nodes of the parent node into groups of one or more nodes each dependent on a combined normalized node weight of each group of nodes;

partitioning the area associated with the parent node and assigning areas created by partitions to each group dependent on each group's combined weight;

repeating dividing and partitioning for all groups associated with the parent node until each group includes a single node.

2. A method as described in claim 1 wherein there are N groups of one or more nodes each dependent on the combined normalized node weight, $W_N$, of each group of nodes and such that $W_N$ of each group approaches a ratio of R=1/N.

3. The method as described in claim 2 wherein N=2.

4. The method as described in claim 2 wherein recursively partitioning further comprising selecting one of a horizontal partition and a vertical partition.

5. The method as described in claim 4 wherein recursively partitioning further comprising selecting one of the horizontal partition and vertical partition dependent on the aspect ratio of areas created by each of the horizontal partition and the vertical partition.

6. The method as described in claim 5 wherein recursively partitioning further comprising selecting one of the horizontal partition and vertical partition having the least aspect ratio.

7. An apparatus for partitioning a three-dimensional graphical environment for displaying representative images of objects in a database comprising:

tree deriver for deriving a hierarchical tree representative of a database of objects from object metadata;

grouper for dividing a parent's associated child nodes into N groups of one or more nodes each dependent on a combined normalized node weight;

determiner for determining a combined normalized node weight for each group; and area partitioner for partitioning an area associated with the graphical environment into a plurality of areas such that the areas are proportional to the weights of the group.

8. The apparatus as described in claim 7 wherein the area partitioner further comprising a vertical partitioner for vertically partitioning and a horizontal partitioner for horizontally partitioning.

9. The apparatus as described in claim 8 wherein the area partitioner further comprising an aspect ratio determiner for determining the aspect ratio of areas created by each of the vertical partitioner and the horizontal partitioner and selecting one of a vertical partition and a horizontal partition dependent on the aspect ratio.

* * * * *